United States Patent
Ge et al.

(10) Patent No.: US 9,454,821 B2
(45) Date of Patent: Sep. 27, 2016

(54) ONE METHOD OF DEPTH PERCEPTION BASED ON BINARY LASER SPECKLE IMAGES

(71) Applicants: Chenyang Ge, Xi'an, Shaanxi (CN); Yanhui Zhou, Xi'an, Shaanxi (CN)

(72) Inventors: Chenyang Ge, Shaanxi (CN); Huimin Yao, Shaanxi (CN); Yanhui Zhou, Shaanxi (CN)

(73) Assignees: Yanhui Zhou (CN); Chenyang Ge (CN)

(*) Notice: Subject to any disclaimer, the term of this patent is extended or adjusted under 35 U.S.C. 154(b) by 99 days.

(21) Appl. No.: 14/591,101

(22) Filed: Jan. 7, 2015

(65) Prior Publication Data
US 2015/0228080 A1 Aug. 13, 2015

(30) Foreign Application Priority Data
Feb. 13, 2014 (CN) .......................... 2014 1 0049323

(51) Int. Cl.
G06K 9/00 (2006.01)
G06T 7/00 (2006.01)
G06T 7/20 (2006.01)
G06K 9/20 (2006.01)

(52) U.S. Cl.
CPC .......... *G06T 7/0065* (2013.01); *G06K 9/2036* (2013.01); *G06T 7/0057* (2013.01); *G06T 7/202* (2013.01); *G06T 2207/10048* (2013.01)

(58) Field of Classification Search
None
See application file for complete search history.

(56) References Cited

U.S. PATENT DOCUMENTS

| | | | | |
|---|---|---|---|---|
| 5,717,615 A | * | 2/1998 | Pirson | G06T 7/202 348/699 |
| 7,333,651 B1 | * | 2/2008 | Kim | G06K 9/6202 345/419 |
| 2004/0005092 A1 | * | 1/2004 | Tomasi | G01B 11/25 382/154 |
| 2008/0240502 A1 | * | 10/2008 | Freedman | G01B 11/2513 382/103 |
| 2010/0007717 A1 | * | 1/2010 | Spektor | G06K 9/00355 348/43 |
| 2010/0177164 A1 | * | 7/2010 | Zalevsky | G01B 11/162 348/46 |
| 2011/0158508 A1 | * | 6/2011 | Shpunt | G01B 11/25 382/154 |

OTHER PUBLICATIONS

Yang, Zhe, et al. "Depth acquisition from density modulated binary patterns." Proceedings of the IEEE Conference on Computer Vision and Pattern Recognition. 2013. 8 pages.*

(Continued)

*Primary Examiner* — Sumati Lefowitz
*Assistant Examiner* — Ryan P Potts

(57) ABSTRACT

A method of depth perception based on binary laser speckle images comprises: read in binary input and reference speckle images (pattern fixed, distance known) to generate input and reference speckle windows, extract an image block of a certain size in the input speckle window, search for the matching block in the matching search window of the reference speckle window, use a method for block-based XOR (exclusive or) similarity calculation to compare and output a minimum similarity value or use a block-based IAD (inclusive and) method to compare and output a maximum similarity value to get the optimal matching block and the optimal offset, and then work out the depth information of the central point of the optimal matching block via a formula for depth calculation. The method not only can be easily implemented in hardware and greatly simplify depth calculation, but can also generate high-resolution and high-precision depth information in a fast and accurate manner.

9 Claims, 4 Drawing Sheets

(56) References Cited

OTHER PUBLICATIONS

Jiang, Jun, Jun Cheng, and Haifeng Zhao. "Stereo Matching Based on Random Speckle Projection for Dynamic 3D Sensing." Machine Learning and Applications (ICMLA), 2012 11th International Conference on. vol. 1. IEEE, 2012. 6 pages.*

Sanmohan, Kasper, et al. "3D scanning of object surfaces using structured light and a single camera image." Automation Science and Engineering (CASE), 2011 IEEE Conference on. IEEE, 2011. 6 pages.*

Rangarajan, Prasanna, et al. "Perspective imaging under structured light." Computer Vision-ECCV 2010. Springer Berlin Heidelberg, 2010. 405-419. 15 pages.*

McNeill, S. R., et al. "Measurement of surface profile using digital image correlation." Experimental Mechanics 37.1 (1997): 13-20. 8 pages.*

* cited by examiner

ONE METHOD OF DEPTH PERCEPTION BASED ON BINARY LASER SPECKLE IMAGES

FIELD OF THE INVENTION

The present invention is classified in the field of image processing, human-computer interaction and machine vision technology, specifically involving a method of depth perception based on binary laser speckle images.

BACKGROUND OF THE INVENTION

The vision is the most direct and important way for human to observe recognize our world. We are living in a three-dimensional world, and the human vision can not only perceive the brightness, color, texture information and movement on the surface of an object, but also distinguish its shape, space and spatial position (depth and distance). Currently, the difficulty in researching the machine vision system is how to acquire the high-precision 3D depth information in a real time and improve the intelligent level of the machine.

In the field of industry, high-resolution and high-precision 3D depth information is widely demanded, such as automotive safety driving assisting, high-speed machine tool processing, industrial modeling, 3D printing, medical imaging and 3D visual perception in the IOT (Internet of Things). In the field of consumer electronics, the depth perception technology and devices can help to improve the intelligent level and interaction ability of electronic products so as to bring "fiction-like" control methods and brand-new man-machine interaction experience for users and achieve innovative applications in the smart TV, smart phones, household appliances, and tablet PC, etc.

Compared with the traditional binocular stereoscopic cameras, the active visual mode based on structured light coding can get image depth information more accurately, stably and reliably, featuring such advantages as no impact of the ambient light, simple stereoscopic matching process and small calculation amount of the algorithm. For example, the somatosensory interaction device of MICROSOFT-KINECT adopts the active visual mode of infrared structured light, namely, the infrared laser projects a fixed image onto the surface of an object to form scattered spots via diffuse reflection on the surface, and the imaging sensor acquires speckle images to obtain the depth information of the object by means of calculation via the image depth sensor chip.

SUMMARY OF THE INVENTION

In view of this, the present invention provides a method of depth perception based on binary laser speckle images, firstly carrying out image preprocessing to get binary images (each pixel is expressed with 0 and 1) of the input laser speckle images (with the depth information unknown) and the reference laser speckle images (as standard matched speckle images, their pattern is fixed, and their depth and distance information is known); then extracting an image block of a certain size from the binary input speckle images for block matching motion estimation, following a certain search strategy and similarity value measurement index to search for the optimal matching block of this image block in the matching search window centered by the corresponding position of the binary reference speckle image and get the offset between this image block and the matching block, which is the motion vector of this image block and expressed by the displacement ($\Delta x$, $\Delta y$) in the X and Y-axis directions, with its starting and ending points respectively corresponding to the central points of the input speckle image block in the speckle window and the central points of optimal matching block in the reference speckle window. The center depth information d' of this image block can be calculated via the depth calculation formula according to the offset in the X or Y-axis direction, as well as the known distance parameter d in the reference laser speckle image, the baseline distance S between the laser projector and the image acquisition device, the focal length f of the image acquisition sensor and the dot pitch parameter $\mu$.

According to the present invention, a method of depth perception based on binary laser speckle images which includes such steps as follows:

Step 1: generate an input speckle window and a reference speckle window: read in multi-line speckle data from the identical location of the binary input and reference speckle images to form such input and reference speckle windows with the size of N lines:

Step 2: in the input speckle window, extract an input image block$_{m\times n}$ with the size of m×n and the center of O: in the reference speckle window, extract a matching search window Match$_{M\times N}$ (whose size is M×N) within a certain range and corresponding to the central point O of the input image block; in the matching search window Match$_{M\times N}$, extract all matching blocks match$_k$ (whose size is m×n) identical to the input image block in size, and the central point of the matching block is $o_k$ in which k is an integer, indicating the number of the matching blocks;

Step 3: calculate the similarity value match_value$_k$ between the input image block block$_{m\times n}$ and all k matching blocks match$_k$ as the index to measure the image block matching similarity:

Step 4: mark the locations of all k similarity values match_value$_k$, in which the location information indicates the offset between the central point $o_k$ of the matching block match$_k$ and the central point o of the matching search window;

Step 5: work out the minimum or maximum value in all k similarity values match_value$_k$, the matching block corresponding to the minimum or maximum value is the optimal matching block of this input image block, the location information corresponding to the optimal matching block is the optimal offset ($\Delta x$, $\Delta y$) of this input image block, namely, the motion vector of this input image block, in which the optimal offset is calculated by the central point coordinate values (x, y) of the reference speckle window deducted by the central point coordinate values (x',y') of the optimal matching block respectively in the X and Y-axis directions;

Step 6: use the optimal offset $\Delta m$ ($\Delta x$ or $\Delta y$) in the X or Y-axis direction, as well as the known distance parameter d in the reference speckle image, the baseline distance S between the laser projector and the image acquisition device, the focal length f of the image sensor and the dot pitch parameter $\mu$ of the image sensor to calculate the depth information d' for the central point o of the input speckle image block block$_{m\times n}$ via the depth calculation formula.

The present invention can rapidly and accurately generate the motion vector of each pixel in an input speckle image and get the depth distance of this pixel point according to the depth calculation formula. Our invention can be completely and easily implemented in hardware, greatly simplify the block matching calculation so as to reduce the resource costs for hardware implementation, and help to generate real-time, high-resolution and high-precision image depth information.

Moreover, the beneficial effects based on the technical solution of the present invention will be concretely demonstrated by further explanation in the following implementation examples.

DETAILED DESCRIPTION OF THE PREFERRED EMBODIMENTS

Here follow further details of the present invention based on illustrations.

Figure 1:
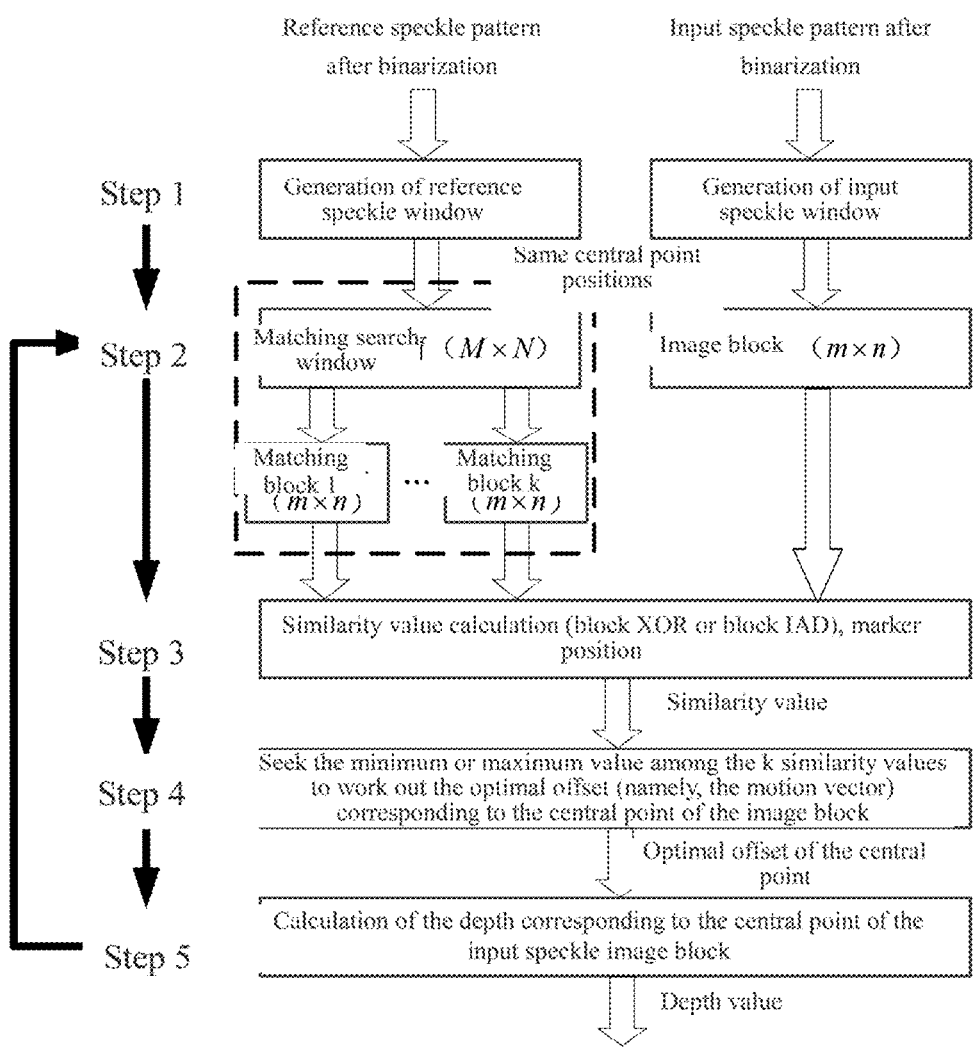
FIG. 1 illustrates the flow chart of the implementation example in the present invention.

FIG. 1 illustrates the overall process for the depth perception based on binary laser speckle images in the implementation example of the present invention. For clearer descriptions, this following text will take advantage of the FIGS. 2, 3 and 4 to describe this method.

The above-mentioned reference speckle patterns are acquired as follows: the irregular laser speckle patterns formed by interference of such laser beams (infrared, visible, ultraviolet and invisible light) with a fixed pattern are projected by a laser projector on the plane (this plane can be formed by a projection cloth and a panel, etc. used to present clear and stable speckle images, and this plane can be called as the datum plane) vertical to the center axis (Z-axis) of the laser projector with the vertical distance known as d; after collected by the image sensor and binarized by image adaptive pre-processing as shown in the binary speckle image in FIG. 2, such patterns will be fixed and stored in the memory and used as the matching benchmark pattern for depth perception and calculation.

The image adaptive preprocessing includes input video format conversion (e.g., Bayer, ITU601, ITU656 or MIPI interface format conversion), color space conversion (for example, from RGB to YUV), grey image's adaptive denoising and enhancement, and grey image's binarization (represented by 0 and 1, in which 1 corresponds to the speckle pixels), etc. in order to make the speckle pattern clearer, reduce the noise interference so as to facilitate calculation of the block matching motion vector in the contents of the present invention.

Figure 2:
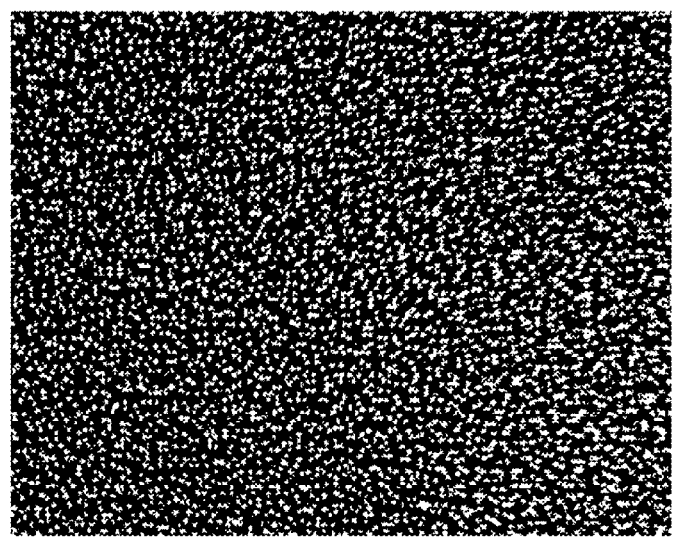
FIG. 2 illustrates the structure schematic for the binary input or reference speckle images in the implementation example of the present invention.

The input speckle image sequence is obtained as follows: the coded speckle patterns identical to the reference speckle images are projected by a laser projector into the space where the target object is located, after the binarization module for adaptive preprocessing of the images identical to the reference speckle image, a binary input speckle pattern as shown in FIG. 2 can be achieved.

Step 1: generate an input speckle window and a reference speckle window: read in multi-line speckle data identically located from the binary input and reference speckle images to form such input and reference speckle windows with the size of N lines; therein, each pixel is represented by 0 and 1.

Step 2: in the input speckle window, extract an input image block $block_{m \times n}$ with the size of m×n and the center of O (therein, the block size parameters m and n are integers equal or unequal): in the reference speckle window, extract a matching search window $Match_{M \times N}$, (whose size is M×N, M and N are integers equal or unequal, generally M≥N, M>m, N≥n) within a certain range and corresponding to the central point o of the input image block; in the matching search window $Match_{M \times N}$, extract all matching blocks $match_k$ (whose size is m×n) identical to the input image block in size, and the central point of the matching block is $o_k$, in which k is an integer, indicating the number of the matching blocks;

Step 3: calculate the similarity value $match\_value_k$ between the input image block $block_{m \times n}$ and all k matching blocks $match_k$ as the index to measure the image block matching similarity;

In an implementation example, the similarity value can be calculated by means of "XOR (exclusive or)" calculation between the pixels corresponding to the input image block $block_{m \times n}$, and the matching block $match_k$, and the result can be used to indicate difference magnitude (the smaller the value, the smaller the difference), and if the XOR result is used as the similarity index, then subsequently it requires that the minimum value should be worked out from such XOR results, with the matching block corresponding to such minimum value as the most similar (the most matched) matching block. In another implementation example, the similarity value can be calculated by means of "IAD (inclusive and)" calculation between the pixels corresponding to the input image block $block_{m \times n}$ and the matching block $match_k$, indicating the number of '1' between the input image block $block_{m \times n}$ and the matching block $match_k$ (the larger the value, the more similar), and if the IAD result is used as the similarity index, then subsequently it requires that the maximum value should be worked out from all values, with the matching block corresponding to such maximum value as the most similar (the most matched) matching block.

Step 4: mark the locations of all k similarity values $match\_value_k$, in which the location information indicates the offset between the central point $o_k$ of the matching block $match_k$ and the central point o of the matching search window;

Therein, the location markers adopt such data structure as [location value, $match\_value_k$], the location value can be expressed in a one-dimensional or two-dimensional mode, which corresponds to the location distance relationship between the central point $o_k$ of this matching block $match_k$ and the central point o of the matching search window $bock_{M \times N}$, and the two-dimensional position is expressed by the offset ($\Delta x$, $\Delta y$), in which both $\Delta x$ and $\Delta y$ are integers, whose positive and negative respectively indicate the left-right and up-down relationship to the central point of the matching search window.

Step 5: work out the minimum or maximum value in all k similarity values $match\_value_k$, the matching block corresponding to the minimum or maximum value is the optimal matching block of this input image block, the location information corresponding to the optimal matching block is the motion vector of this input image block, in which the optimal offset is calculated by the central point coordinate values (x,y) of the reference speckle window deducted by the central point coordinate values (x', y') of the optimal matching block respectively in the X and Y-axis directions;

Therein, the XOR and IAD methods are adopted to work out the minimum value min{match_value$_k$} and the maximum value max{match_value$_k$} respectively. After the minimum or maximum value of the similarity is worked out, the matching block match$_k$ corresponding to this value should be the optimal matching block searched by the image block block$_{m \times n}$, and the location information bound to this minimum or maximum value should be the optimal offset ($\Delta$x, $\Delta$y) of the image block block$_{m \times n}$ central point o, namely, the motion vector of this input image block block$_{m \times n}$, and the offset value is calculated by the central point coordinate values (x, y) of the reference speckle window deducted by the central point coordinate values (x',y') of the optimal matching block in the X and Y-axis directions respectively.

Figure 3:
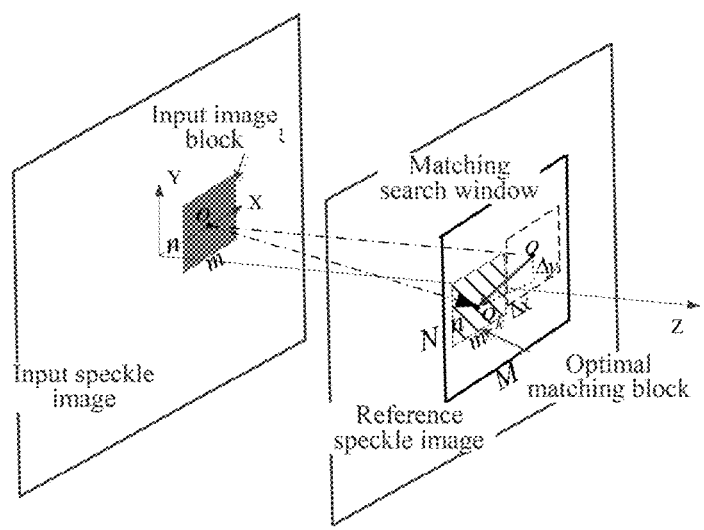
FIG. 3 illustrates the schematic for the offset between the input image block and the optimal matching block in the implementation example of the present invention.

As shown in FIG. 3, the input image block is the grey area in the input speckle pattern and the optimal matching block is the slash area in the matching search window of the reference speckle pattern; the optimal offset is ($\Delta$x, $\Delta$y) between the central point o$_k$ of such slash area and the central point o (whose position corresponds to the central point of the input image block) of the matching search window block$_{M \times N}$, respectively indicating the displacement in the X and Y-axis directions, and its positive and negative values correspond to the up-down and left-right coordinate relationship, while correspond to the front-rear relationship to the plane of the reference speckle pattern in the space; if the optimal offset is positive, it indicates a closer distance to the position of the reference speckle pattern; if the optimal offset is negative, it indicates a farther distance to the position of the reference speckle pattern; at the same time, a greater offset value indicates a longer vertical distance from the central point o of this image block to the reference speckle pattern plane with the depth distance known and as the distance is fixed between the reference speckle pattern plane and the laser projection device, so a greater offset occurs, the distance from this central point o relative to the laser projection device may be closer or further away.

Figure 4:
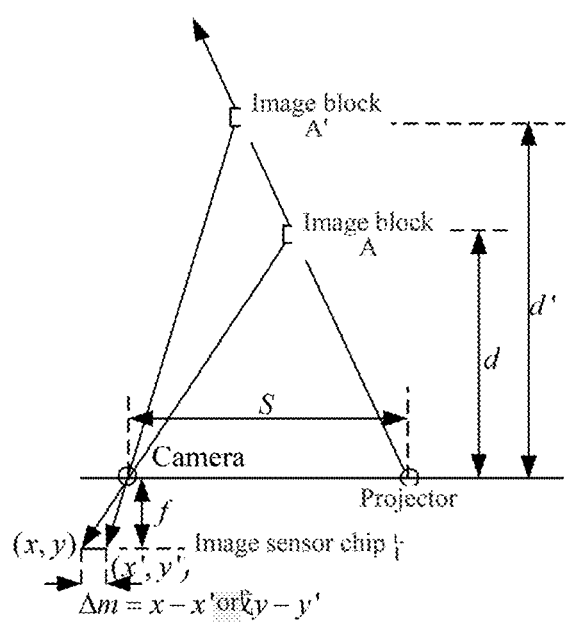
FIG. 4 illustrates the schematic for calculation of the image block depth in the implementation example of the present invention.

Step 6: use the optimal offset $\Delta$m ($\Delta$x or $\Delta$y) in the X or Y-axis direction, as well as the known distance parameter d in the reference speckle image, the baseline distance S between the laser projector and the image acquisition device, the focal length f of the image sensor and the dot pitch parameter $\mu$ of the image sensor to calculate the depth information d' for the central point o of the input speckle image block block$_{m \times n}$ via the depth calculation formula as shown in FIG. 4.

In this implementation example, calculate d' according to the depth calculation formula as follows:

$$d' = d - \frac{\Delta m \mu d^2}{fS + \Delta m \mu d} = \frac{fSd}{fS + \Delta m \mu d}$$

Where, the optimal offset $\Delta$m is equal to the x coordinate value of the reference speckle window central point deducted by the x' coordinate value of the optimal matching block central point, or equal to the y coordinate value of the reference speckle window central point deducted by the y' coordinate value of the optimal matching block central point, and the result may be positive or negative. If the optimal offset $\Delta$m is positive, it indicates a closer distance to the position of the reference speckle pattern; if the optimal offset is negative, it indicates a farther distance to the position of the reference speckle pattern.

Furthermore, move the central point o of the input speckle image block to the next pixel in the same line, repeat the steps 2-6 to calculate the depth value, and follow such calculation sequence point by point and line by line to obtain the depth image corresponding to the input speckle image. Similarly, it can also be used to calculate the depth information of the input image sequence. Moreover, the depth is calculated according to the image block and such image block is fairly small, so its depth information can be ignored for pixels at the image edge, which does not affect the depth calculation of the whole image.

Optimally, if we only focus on the offset $\Delta$x of the image block in the X-axis direction, the matching search window can be selected emphatically by extending the image block left and right along the X-axis direction, namely, if M and N are given a larger value and a smaller value respectively, the number of the matching blocks can be reduced, thus reducing the calculation amount and complexity while improving the operation speed. Similarly, it is true of that along the Y-axis direction of the image block.

As an example, the present invention adopts the conventional full-search strategy to search the matching blocks, and moreover, other kinds of improved search strategies and indexes for similarity measure can also be used, for instance three-step search method (TSS), etc. In the present invention, this similarity value is calculated by means of XOR or IAD calculation, but not limited to such two methods.

In the present invention, the search strategy is to search the matching blocks one by one and its offset (namely, motion vector) accuracy can reach the pixel level or the sub-pixel level through interpolation calculation of the speckle image pixels.

The above implementation example is completed in a specific system, but it is not restricted to the present invention; the present invention can be similarly applied to similar image projection and image sensor systems, and more than one input image block can be used for matching; similarly, more than one reference speckle image can also be used as the standard for matching. Therefore, the modification and perfection not beyond the spirit and range of the present invention should all be included in the range of such claims mentioned above.

What is claimed is:

1. A method for depth perception of binary laser speckle images, comprising the following steps of:
    Step 1: generating an input speckle window and a reference speckle window by reading multi-line speckle data from identical locations of binary input and reference speckle images to form such input and reference speckle windows with N lines;
    Step 2: in the input speckle window, extracting an input image block block$_{m \times n}$ with size of m×n and central point O; in the reference speckle window, extracting a matching search window Match$_{M \times N}$ (size of M×N) within a certain range from the corresponding location of the central point O of the input image block; in the matching search window Match$_{M \times N}$, extracting all matching blocks match$_k$ (each of size m×n) and the central point of each matching block is O$_k$, in which k is an integer;
    Step 3: calculating a similarity value match_value$_k$ between the input image block block$_{m \times n}$ and all k matching blocks match$_k$ as an index to measure block matching similarity;
    Step 4: marking locations of all k similarity values match_value$_k$ with location information indicating the offset between the central point O$_k$ of the matching block match$_k$ and the central point O of the matching search window;

Step 5: working out the minimum or maximum value among all k similarity values $\text{match\_value}_k$, wherein the matching block corresponding to the minimum or maximum value is the optimal matching block of the input image block and the location information corresponding to the optimal matching block is the optimal offset ($\Delta x$, $\Delta y$) of the input image block which is a motion vector of the input image block, wherein the optimal offset is calculated by the coordinate values (x, y) of the central point of the input image block in the reference speckle window deducted by the coordinate values (x', y') of the central point of the optimal matching block in respective X and Y-axis directions; and Step 6: using the optimal offset $\Delta m$ ($\Delta x$ or $\Delta y$) in the respective X or Y-axis direction, as well as a known distance parameter d in the reference speckle image, a baseline distance S between a laser projector and an image acquisition device, a focal length d of an image sensor and a dot pitch parameter μ of the image sensor to calculate depth information d' for the central point O of the input speckle image block $\text{block}_{m \times n}$ via a depth calculation formula.

2. The method according to claim 1, wherein in Step 3, the similarity value $\text{match\_value}_k$ is calculated by means of XOR (exclusive or) calculation between pixels corresponding to the input image block $\text{block}_{m \times n}$ and the matching block $\text{match}_k$.

3. The method according to claim 2, wherein in Step 5, working out the minimum value among all similarity values $\text{match\_value}_k$.

4. The method according to claim 1, wherein in Step 3, the similarity value $\text{match\_value}_k$ is calculated by means of IAD (inclusive and) calculation between pixels corresponding to the input image block $\text{block}_{m \times n}$ and the matching block $\text{match}_k$.

5. The method according to claim 4, wherein in Step 5, working out the maximum value among all similarity values $\text{match\_value}_k$.

6. The method according to claim 1, wherein in Step 4, a marked location adopts such data structure as [location value, $\text{match\_value}_k$, similarity value].

7. The method according to claim 6, wherein the location value can be expressed in a one-dimensional or two-dimensional mode, which corresponds to a location distance relationship between the central point $O_k$ of the matching block $\text{match}_k$ and the central point O of the matching search window $\text{Match}_{M \times N}$, and the two-dimensional mode is expressed by the optimal offset ($\Delta x$, $\Delta y$), in which both $\Delta x$ and $\Delta y$ are integers, whose positive and negative values respectively indicate a left-right and an up-down relationship to the central point of the matching search window.

8. The method according to claim 1, wherein, in Step 6, d' is calculated by the depth calculation formula:

$$d' = d - \frac{\Delta m \mu d^2}{fS + \Delta m \mu d} = \frac{fSd}{fS + \Delta m \mu d};$$

where the optimal offset $\Delta m$ is equal to the x coordinate value of the reference speckle window central point deducted by the x' coordinate value of the optimal matching block central point, or equal to the y coordinate value of the reference speckle window central point deducted by the y' coordinate value of the optimal matching block central point.

9. The method according to claim 1, wherein the method further includes: Step 7: moving the central point O of the input image block to another pixel in the same line, repeating the steps 2-6 to calculate the depth information, and following such calculation, sequentially processing point by point and line by line to obtain a depth image corresponding to the input speckle image.

* * * * *